US009400002B2

(12) United States Patent
Liu et al.

(10) Patent No.: US 9,400,002 B2
(45) Date of Patent: Jul. 26, 2016

(54) LOAD SENSING ELECTRIC-PROPORTIONAL MULTI-WAY VALVE

(71) Applicant: HANGCHA GROUP CO., LTD., Zhejiang (CN)

(72) Inventors: Zhen Liu, Zhejiang (CN); Yuansong Li, Zhejiang (CN); Xipo Chen, Zhejiang (CN); Xiaowei Zhao, Zhejiang (CN); Dahai Sun, Zhejiang (CN); Xun Cao, Zhejiang (CN)

(73) Assignee: HANGCHA GROUP CO., LTD., Zhejiang (CN)

( * ) Notice: Subject to any disclaimer, the term of this patent is extended or adjusted under 35 U.S.C. 154(b) by 56 days.

(21) Appl. No.: 14/564,614

(22) Filed: Dec. 9, 2014

(65) Prior Publication Data

US 2015/0176611 A1 Jun. 25, 2015

(30) Foreign Application Priority Data

Dec. 19, 2013 (CN) .......................... 2013 1 0701920

(51) Int. Cl.
*G05D 11/00* (2006.01)
*F15B 11/17* (2006.01)
*B66F 9/22* (2006.01)

(52) U.S. Cl.
CPC . *F15B 11/17* (2013.01); *B66F 9/22* (2013.01); *F15B 2211/20576* (2013.01); *F15B 2211/30575* (2013.01); *F15B 2211/351* (2013.01); *F15B 2211/353* (2013.01); *F15B 2211/4053* (2013.01); *F15B 2211/40569* (2013.01); *F15B 2211/40592* (2013.01); *F15B 2211/50536* (2013.01); *Y10T 137/2529* (2015.04)

(58) Field of Classification Search
CPC ............... Y10T 137/86574; Y10T 137/86622; Y10T 137/8667
See application file for complete search history.

(56) References Cited

U.S. PATENT DOCUMENTS

| | | | | |
|---|---|---|---|---|
| 7,353,744 B2 * | 4/2008 | Dixen | F15B 11/0445 | 91/446 |
| 7,770,596 B2 * | 8/2010 | Christensen | E02F 9/2267 | 137/596 |
| 8,230,771 B2 * | 7/2012 | Bitter | A01D 41/145 | 60/477 |
| 2003/0196545 A1 * | 10/2003 | Jensen | F15B 11/042 | 91/447 |
| 2004/0216599 A1 * | 11/2004 | Pieper | E02F 9/2225 | 91/446 |

* cited by examiner

*Primary Examiner* — R. K. Arundale
(74) *Attorney, Agent, or Firm* — Remarck Law Group PLC

(57) ABSTRACT

A load sensing electric-proportional multi-way valve. The technical problem to be solved by the present application is to provide a load sensing electric-proportional multi-way valve, enabling individual loops to operate with different loads, to save energy and reduce the environmental pollution. The technical solution for solving the technical issue includes as follows. A load sensing electric-proportional multi-way valve includes a main oil passage connected with two gear pumps P1 and P2, a lifting loop connecting to the main oil passage via an electric-proportional pressure compensated flow control valve, and an inclining union and an attachment union connecting to the main oil passage via an electric-proportional pressure compensated flow control valve, a logic direction valve connected to the main oil passage, a proportional motor-driven overflow valve and a two-way solenoid valve connecting to an oil inlet port of the logic direction valve.

10 Claims, 1 Drawing Sheet

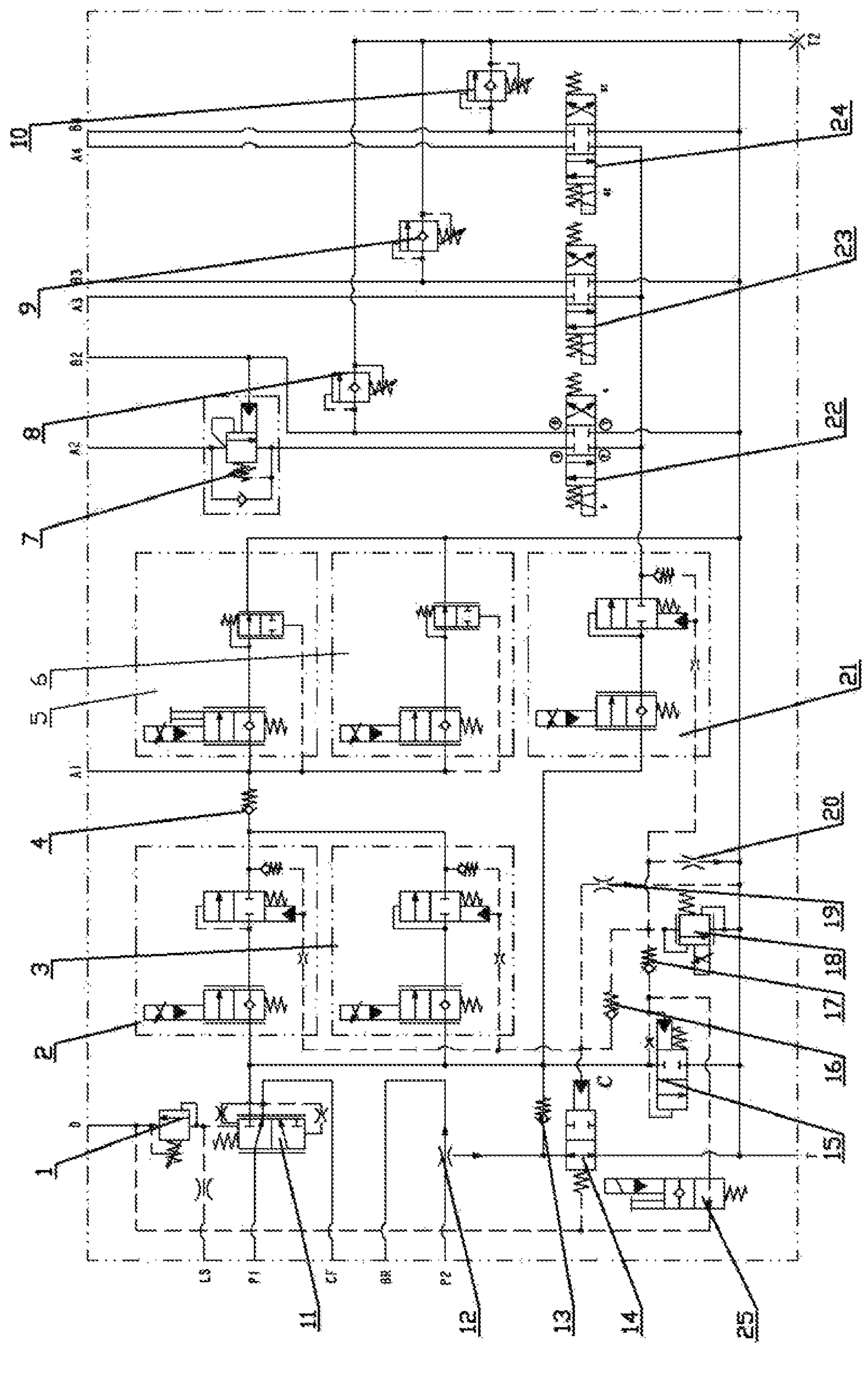
1
2
3
4
5
6
7
8
9
10
11
12
13
14
15
16
17
18
19
20
21
22
23
24
25
LS
P1
CF
BR
P2
A1
A2
B2
A3
B3
A4
B4
T2
C

LOAD SENSING ELECTRIC-PROPORTIONAL MULTI-WAY VALVE

CROSS-REFERENCE TO RELATED APPLICATION

This application claims the priority of Chinese Patent Application No. 201310701920.1, entitled "LOAD SENSING ELECTRIC-PROPORTIONAL MULTI-WAY VALVE", filed with the Chinese Patent Office on Dec. 19, 2013, which is hereby incorporated by reference in its entirety.

FIELD

The present application relates to a multi-way valve, and particularly to a load sensing electric-proportional multi-way valve which is primarily adapted to the technical field of hydraulic system control valves for a forklift truck of 5 to 10 tons.

BACKGROUND

A multi-way directional valve is a combination valve with two or more directional spool valves as a main body. The product may be widely used in various engineering machine, agricultural machine and mining machine. A multi-way directional valve controls at least two actuator elements, and since different actuator elements require different work flows, while an oil source is allocated according to the maximum flow requirement, then if only one actuator element operates or the actuator elements operate at a low speed, redundant oil liquid has to be discharged at a high pressure, which results in loss of functions, excessive heat generation, which is extremely disadvantageous to life of a system and an element. In recent years, people impose higher and higher requirements on energy saving, and impose gradually higher requirements on energy saving and environmental protection of a hydraulic system.

Currently, at home or abroad, a forklift truck of 5 to 10 tons has a large flow requirement when lifting and a relative small flow requirement when inclining or when other attachments operate. However, a forklift truck of 5 to 10 tons generally applies a quantitative system which includes a manually operated multi-way directional valve equipped with two gear pumps. Two pumps cooperate to produce a combined flow of oil when a lifting operation is performed, and when inclining operation is performed or when other attachments operate, since a very small quantity of oil is required, the redundant oil source supplied by a quantitative pump is generally discharged at a pressure set by a safety valve, and as a result, a generator works at an idle speed and is susceptible to be powered off due to a too small torque. So, excepting a simple structure and a low cost, the wasted energy is huge, the manually operated multi-way directional valve requires a great operating force, a large shock in redirecting is generated, and a poor controlling performance is generated, having. However, with the development of science and technology and higher and higher requirements by people, the manually-operated valve can not meet the requirements of people; in addition, it is hard for the above solution to be implemented if a precise inching requirement is imposed on the actuator mechanism.

SUMMARY

To solve the above problem, the application provides a load sensing electric-proportional multi-way valve which can be flexibly operated and has a high precision, and the load sensing electric-proportional multi-way valve may receive from a controller a single or multiple control instruction signals simultaneously, enabling individual loops of the multi-way valve to operate with different loads, and thereby saving energy and reducing environmental pollution.

The present application is embodied by the following technical solutions. A load sensing electric-proportional multi-way valve is provided, which includes a dynamic load sensing pressure compensation valve, a safety valve I and a pressure compensated flow regulating valve I, wherein the dynamic load sensing pressure compensation valve has an oil inlet port connected to a gear pump P1, an oil outlet port connecting a port CF of a redirector, and another oil outlet port connecting a main oil passage of a multi-way valve, and a signal oil port LS of the compensation valve is connected with both a port LS of the redirector and an oil inlet port of the safety valve I, and an oil outlet port of the safety valve I is connected with an oil return port D; the main oil passage, in one aspect, is connected sequentially with a lifting loop and a hydraulic one-way valve I, with an outlet port of the hydraulic one-way valve I being respectively connected with a lifting oil port A1 and a lowering loop in which an oil outlet port is connected with an oil return port T, the main oil passage, in another aspect, is connected with respectively an inclining union and an attachment union via an electric-proportional pressure compensated flow control valve V, and in still another respect, is connected with the oil return port T via a logic direction valve; an oil discharge port of the lifting loop, in one aspect, is connected sequentially with a hydraulic one-way valve III and a proportional motor-driven overflow valve in which an oil outlet port is connected with the oil return port T, and in another aspect, is connected with the oil return port T via a pressure compensated flow regulating valve II; an oil discharge port of the electric-proportional pressure compensated flow control valve V, in one aspect, is connected with the oil return port T via the proportional motor-driven overflow valve, and in another aspect, is connected with the oil return port T via the pressure compensated flow regulating valve III; an oil inlet port of the logic direction valve connected with the main oil passage, in one aspect, is connected with an oil inlet port of the proportional motor-driven overflow valve via a hydraulic one-way valve IV, and in another aspect, is connected with the oil return port D via a two-way solenoid valve; an oil inlet port of the pressure compensated flow regulating valve I is connected with a gear pump P2, and one oil outlet port is connected with an inlet port BR of a braking valve, and another oil outlet port, in one aspect, is connected with the main oil passage via a hydraulic one-way valve II, and in another aspect, is connected with the oil return port T via a two-way hydraulic control directional valve, a control oil port C of the two-way hydraulic control directional valve is connected with an oil discharge port of the lifting loop.

The lifting loop is formed by an electric-proportional pressure compensated flow control valve I and an electric-proportional pressure compensated flow control valve II connected in parallel.

The lowering loop is formed by an electric-proportional pressure compensated flow control valve III and an electric-proportional pressure compensated flow control valve IV connected in parallel.

The inclining union includes a four-position three-way solenoid directional valve I connected with the oil outlet port of the electric-proportional pressure compensated flow control valve V, and an oil return port of the directional valve is connected with the oil return port T, an operating oil port A is connected with an inclining oil port A2 via a balanced valve, and an operating oil port B, in one aspect, is connected with an inclining oil port B2, and in another aspect, is connected with the oil return port T via a safety valve II, and in still another aspect, is connected with a control oil port of the balanced valve.

The attachment union includes an attachment directional valve connected with the oil outlet port of the electric-proportional pressure compensated flow control valve V, and two operating oil ports of the attachment directional valve are respectively connected with two attachment oil ports, an attachment safety valve is connected with one of the operating oil ports, and an oil outlet port of the attachment safety valve is connected with the oil return port T.

There are totally two attachment unions.

The advantageous effects of the present application include: 1, an oil passage of a multi-way valve according to this application is provided with a two-way hydraulic control directional valve, a two-way solenoid valve, a logic direction valve, and a proportional motor-driven overflow valve, thus the two pumps (P1, P2) cooperate to produce a combined flow of oil when a lifting operation is performed, and when other operations are performed, a single pump operates, and the other pump relieves, and thereby redundant power is not generated, and the requirement of energy saving and environmental protection are better met. 2, a function of preventing turning off due to working at an idle speed is achieved by a rotation speed signal of the generator being processed by a controller and the application of a proportional motor-driven overflow valve. 3, with the manual operation in the prior art being replaced by an electric-proportional control, a large shock to the system caused by redirecting is avoided, and the precision of control is improved significantly. 4, this multi-way valve is an integrated valve, with a small volume, a big power, a simplified pipeline connection, thereby leakage points of the hydraulic system are effectively reduced, and the pollution of the environment is also reduced.

BRIEF DESCRIPTION OF THE DRAWINGS

FIG. 1 is a schematic diagram of hydraulic principle of the present application.

DETAILED DESCRIPTION OF THE EMBODIMENTS

As shown in FIG. 1, this embodiment includes a dynamic load sensing pressure compensation valve 11, a safety valve I 1 and a pressure compensated flow regulating valve I 12. Specifically, the dynamic load sensing pressure compensation valve 11 has an oil inlet port connecting a gear pump P1, an oil outlet port connecting a port CF of a redirector, and another oil outlet port connecting a main oil passage of a multi-way valve, and a signal oil port LS of the compensation valve is connected with both a port LS of the redirector and an oil inlet port of the safety valve I 1, and an oil outlet port of the safety valve I 1 is connected with an oil return port D. The main oil passage, in one aspect, is connected sequentially with a lifting loop and a hydraulic one-way valve I 4, with an outlet port of the hydraulic one-way valve I4 being respectively connected with a lifting oil port A1 and a lowering loop in which an oil outlet port is connected with an oil return port T; in another aspect, is connected with respectively an inclining union and an attachment union via an electric-proportional pressure compensated flow control valve V 21; and in still another aspect, is connected with the oil return port T via a logic direction valve 15. An oil discharge port of the lifting loop, in one aspect, is connected sequentially with a hydraulic one-way valve III 16 and a proportional motor-driven overflow valve 18 in which an oil outlet port is connected with the oil return port T, and in another aspect, is connected with the oil return port T via a pressure compensated flow regulating valve II 19. An oil discharge port of the electric-proportional pressure compensated flow control valve V 21, in one aspect, is connected with the oil return port T via the proportional motor-driven overflow valve 18, and in another aspect, is connected with the oil return port T via the pressure compensated flow regulating valve III 20. An oil inlet port of the logic direction valve 15 connected with the main oil passage, in one aspect, is connected with an oil inlet port of the proportional motor-driven overflow valve 18 via a hydraulic one-way valve IV 17, and in another aspect, is connected with the oil return port D via a two-way solenoid valve 25. An oil inlet port of the pressure compensated flow regulating valve I 12 is connected with a gear pump P2, and one oil outlet port is connected with an inlet port BR of a braking valve, and another oil outlet port, in one aspect, is connected with the main oil passage via a hydraulic one-way valve II 13, and in another aspect, is connected with the oil return port T via a two-way hydraulic control directional valve 14. A control oil port C of the two-way hydraulic control directional valve 14 is connected with an oil discharge port of the lifting loop.

Currently, since a single electric-proportional pressure compensated flow control valve manufactured internationally has a small flow, and cannot meet the flow requirements of the lifting loop, hence, the lifting loop according to this embodiment is formed by an electric-proportional pressure compensated flow control valve I 2 and an electric-proportional pressure compensated flow control valve II 3 connected in parallel, each of oil discharge ports of the two flow control valves is connected to an oil inlet port of the hydraulic one-way valve III 16. Similarly, the lowering loop is formed by an electric-proportional pressure compensated flow control valve III 5 and an electric-proportional pressure compensated flow control valve IV 6 connected in parallel. Each of inlet ports of the two flow control valves is connected with an oil outlet port of the hydraulic one-way valve III 16, and each of outlet ports of the two flow control valves is connected with the oil return port T.

The inclining union includes a four-position three-way solenoid directional valve I 22 connected with the oil outlet port of the electric-proportional pressure compensated flow control valve V 21, and an oil return port of the directional valve is connected with the oil return port T. An operating oil port A is connected with an inclining oil port A2 via a balanced valve 7, and an operating oil port B, in one aspect, is connected with an inclining oil port B2, and in another aspect, is connected with the oil return port T via a safety valve II 8, and in still another aspect, is connected with a control oil port of the balanced valve 7.

There are totally two attachment unions in this embodiment, one attachment union is a four-position three-way solenoid directional valve II 23 connected with the oil outlet port of the electric-proportional pressure compensated flow control valve V 21. An oil return port of the directional valve is connected with the oil return port T. One of operating oil ports of the directional valve is connected with an attachment oil port A3, and the other one of the operating oil ports of the directional valve, in one aspect, is connected with an attachment oil port B3, and in another aspect, is connected with the oil return port T via a hydraulic safety valve III 9. The other attachment union is a four-position three-way solenoid directional valve III 24 connected with the oil outlet port of the electric-proportional pressure compensated flow control valve V 21. An oil return port of the directional valve is connected with the oil return port T. One of operating oil ports of the directional valve is connected with an attachment oil port A4, and the other one of the operating oil ports of the directional valve, in one aspect, is connected with an attachment oil port B4, and in another aspect, is connected with the oil return port T via a hydraulic safety valve IV 10.

When redirecting, the hydraulic oil is given priority to enter into the CF port of the redirector after sequentially passing through the gear pump P1 and the dynamic load sensing pressure compensation valve 11, to realize redirecting. When the redirecting oil passage has a too large pressure, the oil is discharged from the safety valve I 1.

When braking, the hydraulic oil enters into the inlet port BR of the braking valve after sequentially passing through the gear pump P2 and the pressure compensated flow regulating valve I 12, to realize braking.

A two-way solenoid valve 25 has two states, when any one or several valves in the five electric-proportional pressure compensated flow control valve is energized, the two-way solenoid valve 25 is then energized and in an close state, and the control oil inside the logic direction valve 15 is required to pass through the hydraulic one-way valve IV 17 and then shunted into two branches, one branch passes through the proportional motor-driven overflow valve 18, and the other branch passes through the pressure compensated flow regulating valve III 20. When the pressure in the oil passage is higher than a pressure set by the proportional motor-driven overflow valve 18, the oil returns to the oil box from the proportional motor-driven overflow valve 18 (safety function); and when the pressure in the oil passage is lower than a pressure set by the proportional motor-driven overflow valve 18, the oil returns to the oil box from the pressure compensated flow regulating valve III 20. When none of the five electric-proportional pressure compensated flow control valves is energized, the two-way solenoid valve 25 is in an on state, and the control oil inside the logic direction valve 15 directly returns to the oil box via the two-way solenoid valve 25.

Only when receiving feedback from a load pressure at the lifting port A1, the control oil port C of the two-way hydraulic control directional valve 14 turns the two-way hydraulic control directional valve 14 into an close state, and the gear pump P2 supplies operating oil to the main oil passage till reaching a lifting state. When none of the inclining union, the attachment union and the forklift truck is to perform action, the control oil port C is connected with the pressure compensated flow regulating valve II 19 and the oil box, there is no pressure signal (no oil source), thus the two-way hydraulic control directional valve 14 is in an open state, and the oil from the gear pump P2 is discharged via the two-way hydraulic control directional valve 14, and the pressure loss is small.

Proportional motor-driven overflow valve 18, as a main safety valve of the system, controls the highest operating pressure of the system. To realize a function of avoiding turning off due to working at an idle speed, when a program sets the rotation speed of the engine to be 750 r/min (an idle speed), a control current signal is provided to the proportional motor-driven overflow valve 18, to control the proportional motor-driven overflow valve 18 to open, and the opening extent of the proportional motor-driven overflow valve 18 influences the pressure set for the proportional motor-driven overflow valve 18 in response to this current signal, the larger the current is, the smaller the pressure set for the proportional motor-driven overflow valve 18, in this way, the operating oil passage is relieved at a very safety pressure to prevent turning off the generator. When the speed of rotation of the engine is larger than 750 r/min set by the program, the program does not control the opening of the proportional motor-driven overflow valve 18, here the function realized by the proportional motor-driven overflow valve 18 is the same as the function realized by a common safety valve.

For a logic direction valve 5, presuming that the quantity of oil provided by the gear pump is larger than the quantity of oil required by a lifting state, an inclining state or an state of an attachment (the opening degree of the electric-proportional pressure compensated flow control valve controls the flow of the load), under this condition, the redundant oil from the gear pump may exit through the logic direction valve 15, and the logic direction valve 15 is a spool valve. In the variable throttling process, a pressure at an inlet port of the electric-proportional pressure compensated flow control valve V 21 should be a load pressure added with a pressure loss of the electric-proportional valve, and the loss of pressure exiting from the valve 15 is the load pressure added with the pressure loss of the electric-proportional valve. However, in a current domestic system, the redundant oil is discharged according to a pressure loss set by an overload valve. When the pressure of the system is excessively high, the logic direction valve 15 and the proportional motor-driven overflow valve 18 implement pressure relief function at first.

When none of the five electric-proportional pressure compensated flow control valves is energized, the oil from the gear pump P1, after passing through the dynamic load sensing pressure compensation valve 11, reaches the oil inlet port of the logic direction valve 15. In this process, the two-way solenoid valve 25 is not energized, and is in a normal open state. If the pressure drop generated by the flow at the oil inlet port of the logic direction valve 15 flowing through a throttling port inside the logic direction valve 15 is larger than a very small spring force of the logic direction valve 15, the valve core moves left, and the logic direction valve 15 is opened. The oil from the gear pump P1 flows sequentially through the dynamic load sensing pressure compensation valve 11, the logic direction valve 15 and the oil return port T and returns to the oil box. The oil from the gear pump P2 flows sequentially through the pressure compensated flow regulating valve I 12, a two-way hydraulic control directional valve 14 and an oil return port T and returns to the oil box. Here the two-way hydraulic control directional valve 14 is normally open, that is, no oil and no load is at the control oil port C of the two-way hydraulic control directional valve 14, and the spring force renders the valve core to be normally open, in this process, the pressure loss generated in the loops of the two pumps is very small, and thereby saving energy and reducing discharge.

When the electric-proportional pressure compensated flow control valve I 2 and the electric-proportional pressure compensated flow control valve II 3 are energized, i.e., in a lifting state, the oil from the gear pump P1 enters into the main oil passage via the dynamic load sensing pressure compensation valve 11, at this time, there is a load at the control oil port C of the two-way hydraulic control directional valve 14, and the pressure generated by this load overcomes the spring force of the two-way hydraulic control directional valve 14, the valve core moves right, the two-way hydraulic control directional valve 14 closes. The oil from the gear pump P2, after flowing through the hydraulic one-way valve IV 17, enters into the main oil passage too, and is converged with the oil from the gear pump P1, and after flowing through the electric-proportional pressure compensated flow control valve I 2 and the electric-proportional pressure compensated flow control valve II 3, the oil reaches the lifting oil port A1 via the hydraulic one-way valve I 4, to provide a stable flow of oil to the port A1 according to the opening size of the proportional valve. The redundant oil provided by the gear pumps P1 and P2 is discharged into the oil box via the logic direction valve 15 according to the load pressure added with a pressure loss of a pressure compensator. Currently at home, under the above operating condition, the redundant oil provided by the gear pumps P1 and P2 returns to the oil box according to the pressure loss set by the overload valve, here, a great deal of energy resources are saved. When the lifting state is overloaded, and the pressure in the operating oil passage is too high, the proportional motor-driven overflow valve 18 functions as a safety valve (similar to a common overload valve).

When the electric-proportional pressure compensated flow control valve III 5 and the electric-proportional pressure compensated flow control valve IV 6 are energized, that is to say, in a lowering state, the oil inside the port A1 (the oil in the lifting cylinder when lifting) flows through the two electric-proportional pressure compensated flow control valves III and IV and flows back to the oil box at a stable flow rate. The oil from the gear pump P1 enters into the main oil passage via the dynamic load sensing pressure compensation valve 11, and directly flows back to the oil box through the logic direction valve 15, and the oil from the gear pump P2 flows through the two-way hydraulic control directional valve 14 and directly flows back to the oil box too.

When the electric-proportional pressure compensated flow control valve V 21 is energized, there is no oil and no load at the control oil port C of the two-way hydraulic control directional valve 14, the spring force renders the two-way hydraulic control directional valve 14 to be in a open state, and the oil from the gear pump P2 flows through the pressure compensated flow regulating valve I 12 and the two-way hydraulic control directional valve 14 and then flows directly back to the oil box. The oil from the gear pump P1 flows through the electric-proportional pressure compensated flow control valve V 21 to an operating apparatus area. The gear pump P1 provides a stable flow according to the load at the oil ports A2 and B2, or A3 and B3, or A4 and B4, and the redundant oil flows back to the oil box through the logic direction valve 15. In such process, the oil from the gear pump P2 is relieved with a slight pressure loss, and thereby the energy is saved.

The invention claimed is:

1. A load sensing electric-proportional multi-way valve, comprising a dynamic load sensing pressure compensation valve, a first safety valve and a first pressure compensated flow regulating valve, wherein the dynamic load sensing pressure compensation valve has a first oil inlet port connecting a first gear pump, a first oil outlet port connecting a port of a redirector, and a second oil outlet port connecting a main oil passage of the multi-way valve, a signal oil port of the dynamic load sensing pressure compensation valve is connected with both a load sensing port of the redirector and a second oil inlet port of the first safety valve; a third oil outlet port of the first safety valve is connected with a first oil return port of the dynamic load sensing pressure compensation valve; the main oil passage is connected sequentially with a lifting loop and a first hydraulic one-way valve, a fourth oil outlet port of the hydraulic one-way valve being respectively connected with a lifting oil port and a lowering loop in which a fifth oil outlet port of the lowering loop is connected with a second oil return port, the main oil passage is connected respectively with an inclining union and an at least one attachment union via a first electric-proportional pressure compensated flow control valve, and is connected with the second oil return port via a logic direction valve; a first oil discharge port of the lifting loop is connected sequentially with a hydraulic one-way valve and a proportional motor-driven overflow valve in which a sixth oil outlet port of the proportional motor-driven overflow valve is connected with the second oil return port, and is connected with the second oil return port via a second pressure compensated flow regulating valve; a second oil discharge port of the first electric-proportional pressure compensated flow control valve is connected with the second oil return port via the proportional motor-driven overflow valve, and is connected with the second oil return port via the pressure compensated flow regulating valve; an oil inlet port of the logic direction valve connected with the main oil passage is connected with an oil inlet port of the proportional motor-driven overflow valve via a second hydraulic one-way valve, and is connected with the first oil return port of the the dynamic load sensing pressure compensation valve via a two-way solenoid valve; an oil inlet port of the first pressure compensated flow regulating valve is connected with a second gear pump, and a seventh oil outlet port of the first pressure compensated flow regulating valve is connected with an inlet port of a braking valve, and an eighth oil outlet port of the first pressure compensated flow regulating valve is connected with the main oil passage via a second hydraulic one-way valve, and is connected with the second oil return port via a two-way hydraulic control directional valve, a first control oil port of the two-way hydraulic control directional valve is connected with a third oil discharge port of the lifting loop.

2. The load sensing electric-proportional multi-way valve according to claim 1, wherein the lifting loop is formed by a fourth electric-proportional pressure compensated flow control valve and a fifth electric-proportional pressure compensated flow control valve connected in parallel.

3. The load sensing electric-proportional multi-way valve according to claim 1, wherein the lowering loop is formed by a fourth electric-proportional pressure compensated flow control valve and a fifth electric-proportional pressure compensated flow control valve IV connected in parallel.

4. The load sensing electric-proportional multi-way valve according to claim 2, wherein the lowering loop is formed by a fourth electric-proportional pressure compensated flow control valve and a fifth electric-proportional pressure compensated flow control valve connected in parallel.

5. The load sensing electric-proportional multi-way valve according to claim 1, wherein the inclining union comprises a four-position three-way solenoid directional valve connected with the second oil discharge port of the first electric-proportional pressure compensated flow control valve, and third oil return port of the two-way hydraulic control directional valve is connected with the second oil return port, a first operating oil port is connected with a first inclining oil port via a balanced valve, and a second operating oil port is connected with a second inclining oil port, and is connected with the second oil return port via a second safety valve, and is connected with a second control oil port of the balanced valve.

6. The load sensing electric-proportional multi-way valve according to claim 2, wherein the inclining union comprises a four-position three-way solenoid directional valve connected with the second oil discharge port of the first electric-proportional pressure compensated flow control valve, and third oil return port of the two-way hydraulic control directional valve is connected with the second oil return port, a first operating oil port is connected with a first inclining oil port via a balanced valve, and a second operating oil port is connected with a second inclining oil port, and is connected with the second oil return port via a second safety valve, and is connected with a second control oil port of the balanced valve.

7. The load sensing electric-proportional multi-way valve according to claim 1, wherein the at least attachment union comprises an attachment directional valve connected with the second oil discharge port of the first electric-proportional pressure compensated flow control valve, and two operating oil ports of the attachment directional valve are respectively connected with two attachment oil ports; an attachment safety valve is connected with one of the operating oil ports, and ninth oil outlet port of the attachment safety valve is connected with the second oil return port.

8. The load sensing electric-proportional multi-way valve according to claim 2, wherein the at least attachment union comprises an attachment directional valve connected with the second oil discharge port of the first electric-proportional pressure compensated flow control valve, and two operating oil ports of the attachment directional valve are respectively connected with two attachment oil ports; an attachment safety valve is connected with one of the operating oil ports, and ninth oil outlet port of the attachment safety valve is connected with the second oil return port.

9. The load sensing electric-proportional multi-way valve according to claim 7, wherein there are a total of two attachment unions.

10. The load sensing electric-proportional multi-way valve according to claim 8, wherein there are a total of two attachment unions.

* * * * *